Nov. 12, 1929.  R. F. BACON  1,734,991
RECOVERY OF SULPHUR FROM ROASTER GASES
Filed May 6, 1927
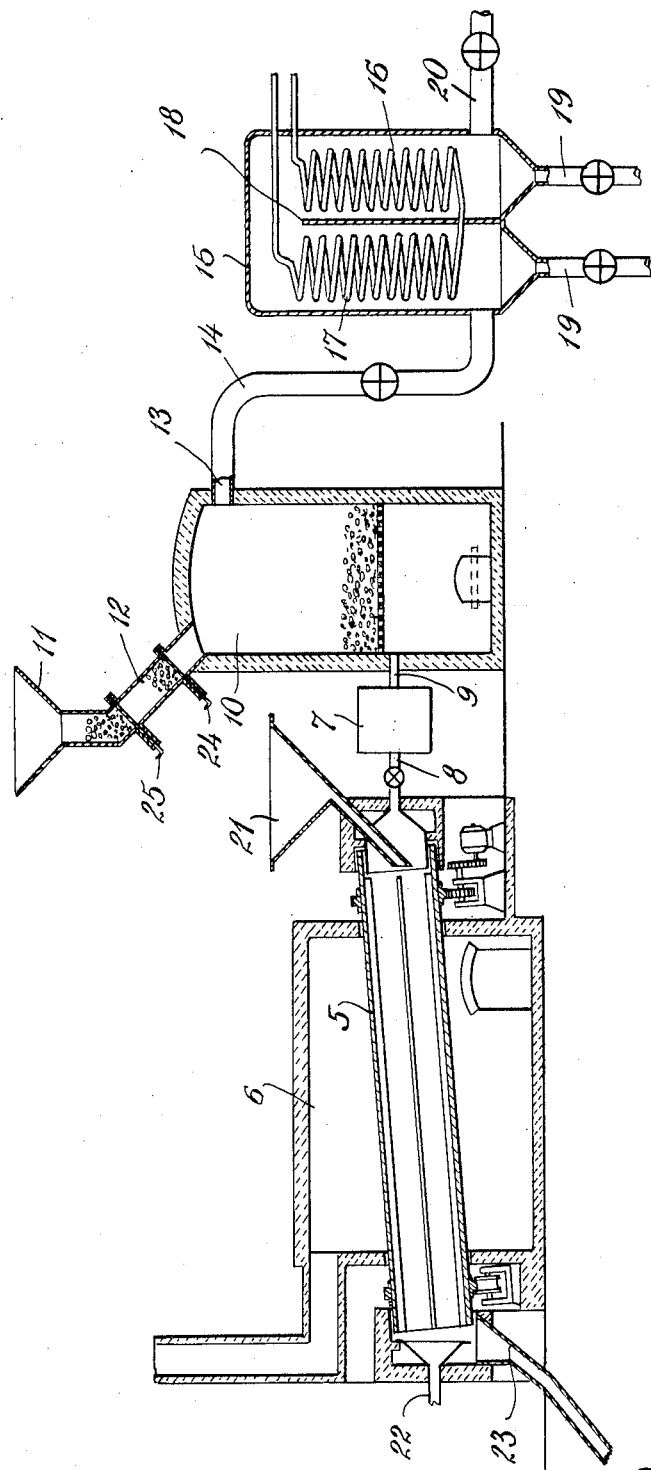
INVENTOR
Raymond F. Bacon
BY
Pennie, Davis, Marvin and Edmonds
HIS ATTORNEYS Patented Nov. 12, 1929

1,734,991

UNITED STATES PATENT OFFICE

RAYMOND F. BACON, OF BRONXVILLE, NEW YORK

RECOVERY OF SULPHUR FROM ROASTER GASES

Application filed May 6, 1927. Serial No. 189,273.

This invention relates to the recovery of sulphur from roaster gases, and has for its object the provision of an improved method of recovering sulphur in elemental form from roaster gases. More particularly, the invention aims to provide an improved method of recovering elemental sulphur from roaster gases by means of reducing the roaster gases under pressure.

Sulphur dioxide may be reduced to elemental sulphur by suitable high temperature treatment with reducing agents, such as carbonaceous fuels in the nature of coke, liquids in the nature of petroleum, or gases in the nature of natural gas, producer gas or water gas. When it is desired to carry out this reaction, making use of roaster gases as the source of sulphur dioxide, the dilute nature of the roaster gases and the consequent low content of sulphur dioxide tend to make the commercial practice impracticable. This is so principally because of the immense volume of gases which must be heated to a high temperature.

I have discovered that the reduction of the sulphur dioxide and the recovery of the reduced sulphur may be carried out more easily and thoroughly when the roaster gases are submitted to a pressure of four or five atmospheres.

I have further discovered that, when the reduction process is carried out under a pressure of four or five atmospheres, the reduction reactions take place without the application of external heat once they are brought to the proper temperature.

In the practice of the invention, I have found it advantageous to place a pressure pump in the line carrying the exhaust gases leaving the roasting furnace. It has been found advantageous to place the pressure pump close enough to the roasting furnace as well as the subsequent reducing chamber, so that there will be very little loss of heat by radiation as the gases pass from the roasting furnace to the reduction chamber.

I have further discovered that the reduced elemental sulphur may be more thoroughly and completely recovered, if the condensation and separation are carried out under the same pressure of four or five atmospheres. In order to maintain this pressure in the condensing chamber, I have found it advantageous to place control valves on the outlet pipes of the old condenser, thus controlling the egress of gases not only from the openings provided for the withdrawal of spent gas, but also controlling the egress of gases from the openings provided for the withdrawal of condensed elemental sulphur.

Various forms of apparatus are available for the practice of the invention. In the single figure of the drawing, I have illustrated an apparatus satisfactory for the purpose.

The apparatus illustrated in the drawing comprises a rotating, inclined, cylindrical retort 5 of any appropriate material adapted to withstand corrosive influences encountered in roasting sulphur-bearing compounds to obtain sulphur dioxide. The retort is enclosed for the greater part of its length in an appropriate furnace structure 6.

The upper or charging end of the retort is operatively connected to a pressure pump 7 by the valved pipe 8. The pump 7 is operatively connected to the reduction furnace or chamber 10 by the pipe 9.

The reduction chamber is supplied with reducing material in any appropriate manner. Coal or coke may be obtained for this purpose from the hopper 11 through the valved pipe 12. The reduced gases are withdrawn from the reducing chamber 10 through an opening 13 which is operatively connected to the pressure condenser 15 by the valved pipe 14.

The pressure condenser 15 is adapted to chill the entering vapors by means of the cooling coils 16 and 17 and is preferably divided into two portions by the baffle wall 18. Suitable valved sulphur withdrawing passages 19 are provided in the condenser compartment bottoms and a valved gas exit passage 20 is adapted to release the spent gases from the processes.

The operation of the apparatus will be understood from the foregoing description. Sulphur-bearing material in the nature of pyrites is fed into the retort 5 through the hopper 21. Air to support combustion is admitted through the opening 22 and the spent cinder or ash is withdrawn from the lower end of the retort 5 through the hopper 23. During the operation of the retort external heat is applied to the retort by means of the furnace 6.

The pressure pump 7 withdraws the sulphur dioxide bearing gas from the retort 5 through the valved pipe 8 and forces the compressed gas under pressure through the pipe 9 into the reducing furnace or chamber 10. In the form of apparatus illustrated the sulphur dioxide gases pass through the heated or glowing bed of carbonaceous material, such as coal or coke, and the sulphur dioxide is reduced to elemental sulphur and inert gas. The mixture of vapors is released from the reducing chamber through the exit passage 13.

The suitable carbonaceous fuel is admitted to the reducing chamber from the supply hopper 11 through the valved pipe 12. The two valves 24 and 25 in the pipe 12 are alternately opened so that there is a minimum loss of pressure in the reduction chamber during the charging process. A suitable reservoir for spent cinder or ash is provided in the lower portion of the reducing chamber and appropriate means (not shown) provided for periodically withdrawing the ash.

The vapors issuing through the exit passage 13 pass through the valved passageway 14 to the condenser 15 where they are appropriately cooled by contact with the cooling coils 16 and 17. The vapors in their passage through the condenser 15 pass up and over the baffle wall 18 and thus are brought successively in contact with the cooling coils 17 and 16 and in that manner are gradually cooled since the cooling liquid passes successively from coil 16 to coil 17.

The condensed sulphur falls to the bottom of the condenser where it is intermittently withdrawn through the valved passages 19. The spent gases are permitted to escape through the valved passage 20. The regulation of the valve in the passage 20 determines largely the pressure which is maintained in the condenser and the reduction chamber.

While certain forms of apparatus have been illustrated, it will be understood that these may be changed or varied at will without in any way departing from the spirit of the invention. The use of a liquid hydrocarbon in place of the solid carbonaceous fuel would necessitate a different type of reduction chamber as would the use of a gaseous reducing agent. The type of condenser may be changed to suit any operating condition which may be met. The oxidizing retort might be altered to better handle a given type of sulphur bearing material.

I claim:

1. The method of recovering sulphur from roaster gas which comprises, compressing the gas, reducing the compressed gas with hot reducing agents and recovering sulphur from the reduced gas.

2. The method of recovering sulphur from roaster gas which comprises, compressing the gas, reducing the compressed gas with hot reducing agents and recovering sulphur from the reduced gas under pressure.

3. The method of recovering sulphur from roaster gas which comprises, compressing the gas to a pressure of from four to five atmospheres, reducing the compressed gas with hot reducing agents and recovering sulphur from the reduced gas.

4. The method of recovering sulphur from roaster gas which comprises, compressing the gas to a pressure of from four to five atmospheres, reducing the compressed gas with hot reducing agents and recovering sulphur from the reduced gas under pressure.

5. The method of recovering sulphur from roaster gas which comprises, compressing the gas, reducing the gas continuously without the application of external heat and recovering sulphur from the reduced gas.

6. The method of recovering sulphur from roaster gas which comprises, heating carbonaceous reducing agents to an appropriate degree, and maintaining the heat by the reaction of the roaster gas and the carbonaceous reducing agents under pressure.

7. The method of recovering sulphur from roaster gas which comprises, heating carbonaceous reducing agents to an appropriate degree, maintaining the heat by the reaction of the roaster gas and the carbonaceous reducing agents under pressure, and recovering sulphur from the reduced gas.

8. The method of recovering sulphur from roaster gas which comprises, heating carbonaceous reducing agents to an appropriate degree, maintaining the heat by the reaction of the roaster gas and the carbonaceous reducing agents under pressure, and recovering sulphur from the reduced gas under pressure.

In testimony whereof I affix my signature.

RAYMOND F. BACON.